US011938395B2

(12) United States Patent
Shigeta

(10) Patent No.: US 11,938,395 B2
(45) **Date of Patent: *Mar. 26, 2024**

(54) TABLE GAME SYSTEM

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 425 days.

This patent is subject to a terminal disclaimer.

(21) Appl. No.: 17/197,392

(22) Filed: Mar. 10, 2021

(65) Prior Publication Data

US 2021/0197068 A1 Jul. 1, 2021

Related U.S. Application Data

(63) Continuation of application No. 16/898,688, filed on Jun. 11, 2020, now Pat. No. 11,033,803, which is a (Continued)

(30) Foreign Application Priority Data

Oct. 23, 2012 (JP) ................................ 2012-246729

(51) Int. Cl.
*A63F 1/14* (2006.01)
*A63F 1/00* (2006.01)
(Continued)

(52) U.S. Cl.
CPC .................. *A63F 1/14* (2013.01); *A63F 1/12* (2013.01); *A63F 1/18* (2013.01); *G07F 17/3241* (2013.01);
(Continued)

(58) Field of Classification Search
CPC ...... A63F 1/12; A63F 1/14; A63F 1/18; A63F 2009/58; A63F 2009/252; A63F 2250/58; G07F 17/3241; G07F 17/3293
(Continued)

(56) References Cited

U.S. PATENT DOCUMENTS 4,779,401 A 10/1988 Pedersen
5,356,145 A 10/1994 Verschoor
(Continued)

FOREIGN PATENT DOCUMENTS

AU 2004203225 A1 2/2005
AU 2011303293 A1 4/2013
(Continued)

OTHER PUBLICATIONS

US Notice of Allowance dated Mar. 16, 2023 for U.S. Appl. No. 17/381,616.

(Continued)

*Primary Examiner* — Joseph B Baldori
(74) *Attorney, Agent, or Firm* — NORTON ROSE FULBRIGHT US LLP

(57) ABSTRACT

A table game system is provided capable of identifying shuffled playing cards used at the time of the occurrence of a problem in a card shoe apparatus, thereby enabling an investigation of the cause thereof or the taking of countermeasures therefor. A card shoe apparatus of the table game system of the present invention includes a barcode reader that reads a barcode provided in a shuffled playing card set, thereby reading a shuffled card ID that uniquely identifies the shuffled playing card set. A sensor for detecting the opening/closing of the lid is provided under the lid to detect the opening/closing of the lid, thereby detecting replacement
(Continued)

of the shuffled playing card set. A control unit further includes a function of storing security items in connection with a shuffled card ID.

5 Claims, 9 Drawing Sheets

Related U.S. Application Data continuation of application No. 16/160,617, filed on Oct. 15, 2018, now Pat. No. 10,722,780, which is a continuation of application No. 14/438,178, filed as application No. PCT/JP2013/004215 on Jul. 8, 2013, now Pat. No. 10,130,867.

(51) Int. Cl.
*A63F 1/12* (2006.01)
*A63F 1/18* (2006.01)
*A63F 9/24* (2006.01)
*G07F 17/32* (2006.01)

(52) U.S. Cl.
CPC ... *A63F 2001/008* (2013.01); *A63F 2009/242* (2013.01); *A63F 2009/2439* (2013.01); *A63F 2250/58* (2013.01); *G07F 17/3293* (2013.01)

(58) Field of Classification Search
USPC .......................................... 273/148 A, 149 R
See application file for complete search history.

(56) References Cited

U.S. PATENT DOCUMENTS

| | | | | |
|---|---|---|---|---|
| 5,374,061 | A | 12/1994 | Albrecht | |
| 6,886,829 | B2 * | 5/2005 | Hessing | A63F 1/14 273/149 P |
| 7,407,438 | B2 | 8/2008 | Schubert et al. | |
| 7,556,197 | B2 * | 7/2009 | Yoshida | G06K 7/10 235/436 |
| 8,033,548 | B2 | 10/2011 | Shigeta | |
| 8,308,163 | B2 | 11/2012 | Shigeta | |
| 8,408,550 | B2 * | 4/2013 | Walker | G07F 17/3202 463/29 |
| 8,534,671 | B2 * | 9/2013 | Nicely | G07F 17/3293 463/14 |
| 8,544,847 | B2 | 10/2013 | Emori | |
| 8,556,262 | B2 | 10/2013 | Shigeta | |
| 8,591,989 | B2 | 11/2013 | Chou et al. | |
| 8,899,588 | B2 | 12/2014 | Shigeta | |
| 8,919,777 | B2 | 12/2014 | Shigeta | |
| 8,998,210 | B2 | 4/2015 | Shigeta | |
| 9,126,104 | B2 | 9/2015 | Shigeta | |
| 9,474,958 | B2 | 10/2016 | Shigeta | |
| 10,112,105 | B2 * | 10/2018 | Shigeta | G07F 17/3241 |
| 10,130,867 | B2 * | 11/2018 | Shigeta | A63F 1/12 |
| 10,500,477 | B2 * | 12/2019 | Shigeta | A63F 1/14 |
| 10,556,171 | B2 * | 2/2020 | Shigeta | A63F 1/14 |
| 10,722,780 | B2 * | 7/2020 | Shigeta | A63F 1/18 |
| 11,033,803 | B2 * | 6/2021 | Shigeta | A63F 1/12 |
| 11,103,768 | B2 * | 8/2021 | Shigeta | A63F 1/14 |
| 11,731,033 | B2 * | 8/2023 | Shigeta | A63F 1/18 273/149 R |
| 2002/0068635 | A1 * | 6/2002 | Hill | A63F 1/14 463/47 |
| 2003/0054887 | A1 | 3/2003 | Dettrey et al. | |
| 2003/0064775 | A1 | 4/2003 | Fujimoto et al. | |
| 2004/0026636 | A1 | 2/2004 | Shigeta | |
| 2005/0026683 | A1 | 2/2005 | Fujimoto | |
| 2005/0082750 | A1 * | 4/2005 | Grauzer | G07F 17/32 273/149 R |
| 2006/0063577 | A1 | 3/2006 | Downs, III et al. | |
| 2006/0157932 | A1 | 7/2006 | Latell | |
| 2006/0247036 | A1 | 11/2006 | Shigeta | |
| 2007/0004499 | A1 | 1/2007 | Gioia et al. | |
| 2007/0024449 | A1 * | 2/2007 | Bilyeu | G06K 17/00 340/573.1 |
| 2007/0049368 | A1 | 3/2007 | Kuhn et al. | |
| 2007/0216092 | A1 | 9/2007 | Fleckenstein | |
| 2008/0006997 | A1 | 1/2008 | Tsai et al. | |
| 2008/0085769 | A1 | 4/2008 | Lutnick et al. | |
| 2008/0143048 | A1 | 6/2008 | Shigeta | |
| 2008/0224394 | A1 | 9/2008 | Shigeta | |
| 2009/0140492 | A1 | 6/2009 | Yoseloff et al. | |
| 2009/0186676 | A1 | 7/2009 | Amaitis et al. | |
| 2009/0224476 | A1 | 9/2009 | Grauzer et al. | |
| 2010/0038849 | A1 | 2/2010 | Scheper et al. | |
| 2010/0213667 | A1 | 8/2010 | Grauzer et al. | |
| 2010/0222140 | A1 | 9/2010 | Dewaal | |
| 2010/0273547 | A1 | 10/2010 | Stasi et al. | |
| 2010/0314834 | A1 | 12/2010 | Shigeta | |
| 2010/0327525 | A1 | 12/2010 | Shigeta | |
| 2011/0127722 | A1 | 6/2011 | Emori et al. | |
| 2011/0130185 | A1 | 6/2011 | Walker | |
| 2012/0146285 | A1 | 6/2012 | Grauzer et al. | |
| 2013/0170429 | A1 | 7/2013 | Yamamoto et al. | |
| 2013/0303277 | A1 | 11/2013 | Shigeta | |
| 2015/0258420 | A1 | 9/2015 | Shigeta | |
| 2015/0290527 | A1 | 10/2015 | Shigeta | |
| 2017/0024449 | A1 | 1/2017 | Wesley, Sr. et al. | |

FOREIGN PATENT DOCUMENTS

| | | | |
|---|---|---|---|
| CN | 1498126 | A | 5/2004 |
| CN | 1830511 | A | 9/2006 |
| CN | 1933881 | A | 3/2007 |
| CN | 101437586 | A | 5/2009 |
| CN | 201263881 | Y | 7/2009 |
| CN | 101500665 | Y | 8/2009 |
| CN | 101541388 | A | 9/2009 |
| CN | 101584934 | A1 | 11/2009 |
| CN | 201389327 | Y | 1/2010 |
| CN | 101804251 | A | 8/2010 |
| CN | 101884840 | A | 11/2010 |
| CN | 101959563 | A | 1/2011 |
| CN | 102186542 | A | 9/2011 |
| CN | 102307633 | A | 1/2012 |
| CN | 102376184 | A | 3/2012 |
| CN | 102413884 | A | 4/2012 |
| CN | 103768786 | A | 5/2014 |
| EP | 1316341 | A1 | 6/2003 |
| EP | 1335783 | A | 8/2003 |
| EP | 2228106 | A1 | 9/2010 |
| JP | 2003070956 | A | 3/2003 |
| JP | 2004215806 | A | 8/2004 |
| JP | 2004299878 | A | 10/2004 |
| JP | 2005046621 | A | 2/2005 |
| JP | 2005296634 | A | 10/2005 |
| JP | 2006526425 | A | 11/2006 |
| JP | 2008029865 | A | 2/2008 |
| JP | 2008081238 | A1 | 4/2008 |
| JP | 2008188471 | A | 8/2008 |
| JP | 2009165835 | A | 7/2009 |
| JP | 2011024603 | A | 2/2011 |
| JP | 2011115266 | A | 6/2011 |
| JP | 2012061023 | A | 3/2012 |
| JP | 2014083414 | A | 5/2014 |
| KR | 1020070030151 | A | 3/2007 |
| KR | 1020100109548 | A | 10/2010 |
| WO | 2004108238 | A1 | 12/2004 |
| WO | 2006076468 | A | 7/2006 |
| WO | 2009069708 | A1 | 6/2009 |
| WO | 2009110232 | A1 | 9/2009 |
| WO | 2012035715 | A1 | 9/2009 |
| WO | 2009126780 | A2 | 10/2009 |
| WO | 2012035742 | A1 | 3/2012 |

(56) References Cited

FOREIGN PATENT DOCUMENTS

| | | | |
|---|---|---|---|
| WO | 2014064868 | A1 | 5/2014 |
| WO | 2014064872 | A1 | 5/2014 |

OTHER PUBLICATIONS

Malaysian Notice of Grant on MY Patent Application PI2017001896 received on May 3, 2021 (dated Jan. 15, 2021) cites the patent documents above.
Japanese Office Action dated Jun. 28, 2022 for JP Patent Application 2021-174289.
Chinese Office Action on CN Patent Application 201810597960.9 dated Feb. 1, 2021 cites the patent documents above.
International Application Serial No. PCT/JP2013/004215, International Search Report dated Oct. 2, 2013.
Korean Office Action and its partial English translation, dated Nov. 24, 2016 for Korean Patent Application No. 10-2015-7010380.
Australia Patent Examination Report, Australian Patent Application No. 2013203298, dated Feb. 6, 2015.
Macau Office Action and its partial English translation, Macau Patent Application No. I/001210, dated Dec. 17, 2014.
Chinese Office Action and its partial English translation, Chinese Patent Application No. 201310213631.7, dated Jan. 27, 2016.
Chinese Office Action and its partial English translation, Chinese Patent Application No. 201380055330.4, dated Dec. 1, 2016.
New Zealand Further Examination Report, NZ Patent Application No. 707157, dated Jan. 12, 2017.
International Search Report, Intemational Application No. PCT/JP2013/004812, dated Oct. 2, 2013.
Japanese Office Action, Japanese Application No. 2012246729, dated Jun. 14, 2016.
U.S. Office Action for U.S. Appl. No. 14/438,211, dated Mar. 3, 2016.
Office Action dated Sep. 8, 2017 for New Zealand Application 731436.
U.S. Office Action for U.S. Appl. No. 14/438,178, dated Jul. 26, 2016.
U.S. Final Office Action for U.S. Appl. No. 14/438, 178, dated Mar. 9, 2017.
U.S. Office Action for U.S. Appl. No. 14/438,178, dated Oct. 5, 2017.
Further Examination Report dated Apr. 10, 2018 for New Zealand Application No. 731436.
Office Adion dated Jun. 26, 2018 for Japanese Aplication No. 2018-029537.
Further Examination Report on New Zealand Patent Application 731745 dated Jul. 24, 2018.
Further Examination Report on New Zealand Patent Application 731436 dated Aug. 2, 2018.
US Office Action dated Jun. 22, 2018 issued for U.S. Appl. No. 14/438,211.
Chinese Office Action dated Apr. 3, 2020 for corresponding CN Application 201710843148.5 cites the patent documents above.
Office Action for CN Application No. 201611002121.5 dated Aug. 23, 2019.
Office Action for JP Application No. 2018-226431 dated Oct. 8, 2019.
Final Office Action dated Dec. 27, 2018 for U.S. Appl. No. 14/438,211.
Australian Examination Report No. 2 dated Dec. 6, 2021 for AU Patent Application 2019279960 cites the patent documents above.
Malaysian Office Action dated Nov. 2, 2023 for MY Patent Application PI2018001816.

* cited by examiner

TABLE GAME SYSTEM

CROSS-REFERENCE TO RELATED APPLICATIONS

This application is a continuation of U.S. application Ser. No. 16/898,688 filed Jun. 11, 2020, which is a continuation of U.S. application Ser. No. 16/160,617, filed Oct. 15, 2018 (now U.S. Pat. No. 10,722,780), which is a continuation of U.S. application Ser. No. 14/438,178, filed Apr. 23, 2015 (now U.S. Pat. No. 10,130,867), which is a national stage application pursuant to 35 U.S.C. § 371 of International Application No. PCT/JP2013/004215, filed Jul. 8, 2013, which claims priority to JP Application No. 2012-246729, filed Oct. 23, 2012, the disclosures of each of which are hereby incorporated by reference.

TECHNICAL FIELD

The present invention relates to a table game system with a security function in a card game such as baccarat using playing cards (hereinafter simply referred to as "cards").

BACKGROUND ART

In poker, baccarat, bridge, blackjack, and other card games, a dealer sets one or more decks of playing cards in a card shoe or the like, and deals cards to game players by drawing them therefrom one by one. In so doing, to ensure the fairness of the games, the cards need to be dealt at random. Therefore, a game host must sufficiently shuffle the playing cards randomly to ensure a random order of arrangement of the playing cards before they are set in the card shoe. The shuffled playing cards used in various card games such as poker, baccarat, bridge or blackjack will ordinarily include 416 cards if eight decks of cards are used.

A conventional card shuffling device for shuffling cards is disclosed in, for example, Patent Literature 1. Each shuffled playing card set is provided after being shuffled with a shuffling apparatus to be arranged in a unique order with a uniquely identifiable shuffled card ID affixed on its packing box or the like as a barcode.

CITATION LIST

PTL 1: WO 2009/069708

SUMMARY OF INVENTION

A cut card is used to prevent any player from counting the ranks of the cards dealt during a game to predict the ranks of the cards when the number of cards not yet dealt becomes small. Usually, the cut card is inserted into the shuffled playing cards before the beginning of the first game, and the cards are dealt onto the game table one by one by the dealer or the like. When the cut card is drawn from the card shoe apparatus, the card set that is currently being used is no longer used and is replaced. This makes it impossible to identify the shuffled playing card set that is currently being used at the game table since the shuffled playing card set is often replaced with a new one. For this reason, in case of any problem with the card shoe apparatus or if any irregular card has been inserted, it is difficult to investigate the cause thereof or to take counter-measures therefor, which is a problem.

The present invention has been made in view of the above problem, and aims to provide a table game system that is capable of identifying the shuffled playing card set that is currently being used at a game table, and also capable of, if any problem occurs with a card shoe apparatus or if the insertion of any irregular card is found, identifying the shuffled playing card set that has been used at the time of the occurrence thereof, thereby enabling an investigation of the cause thereof or the taking of countermeasures therefor.

To solve the above conventional problems, the present invention provides a table game system including: shuffled playing cards composed of playing cards made up of a plurality of number of decks shuffled to have a unique arrangement order, a uniquely identifiable shuffled card ID being attached to the shuffled playing cards as an ID code; and a card shoe apparatus that includes a barcode reader or an input means capable of identifying the shuffled card ID, and houses the shuffled playing cards such that the housed shuffled playing cards are manually dealt one by one onto a game table, the card shoe apparatus including: a card housing unit for housing the shuffled playing cards; a lid that enables the entry/removal of the shuffled playing cards; an opening for drawing cards from the card housing unit one by one; a card reading unit that reads from a card drawn from the card housing unit onto the game table information contained in the said card on a rank thereof; a control unit that stores rules of a card game and includes a winner/loser determination unit that determines the winner/loser of the card game based on the information on the ranks of the cards read by the card reading unit; and a display unit that outputs a result of the winner/loser determined by the winner/loser determination unit, wherein the control unit has a function of storing the uniquely identifiable shuffled card ID read by the barcode reader or the input means, identifying the shuffled playing cards as the card set to be used in a current game in connection with the shuffled card ID, and storing each specified event that occurs during the use of said identified shuffled playing cards at a game table, and the items of the specified events stored in connection with the shuffled card ID include at least one of the following: (1) a reading error in the card reading unit of a card in the identified shuffled playing cards; (2) an end of a game due to an operation of an end button to end the use of the shuffled playing cards currently set in the card shoe apparatus, or the drawing of a cut card from the shuffled playing cards currently set in the card shoe apparatus; (3) an attempt to draw a card when no card should be drawn according to the rules of the card game; (4) an attempt to move or insert a card in a direction opposite to a drawing direction of a card at the opening; and (5) an occurrence of a preset irregular operation to be determined to be irregular by the card shoe apparatus.

With the present invention, it is possible to provide a table game system that is capable of, if any problem occurs with a card shoe apparatus or if the insertion of any irregular card is found, identifying the shuffled playing card set being used at the time of the occurrence thereof, and thereby enables the investigation of the cause thereof or the taking of counter-measures therefor by identifying the shuffled playing card set being used at the time of occurrence thereof.

DESCRIPTION OF EMBODIMENTS

Figure 1:
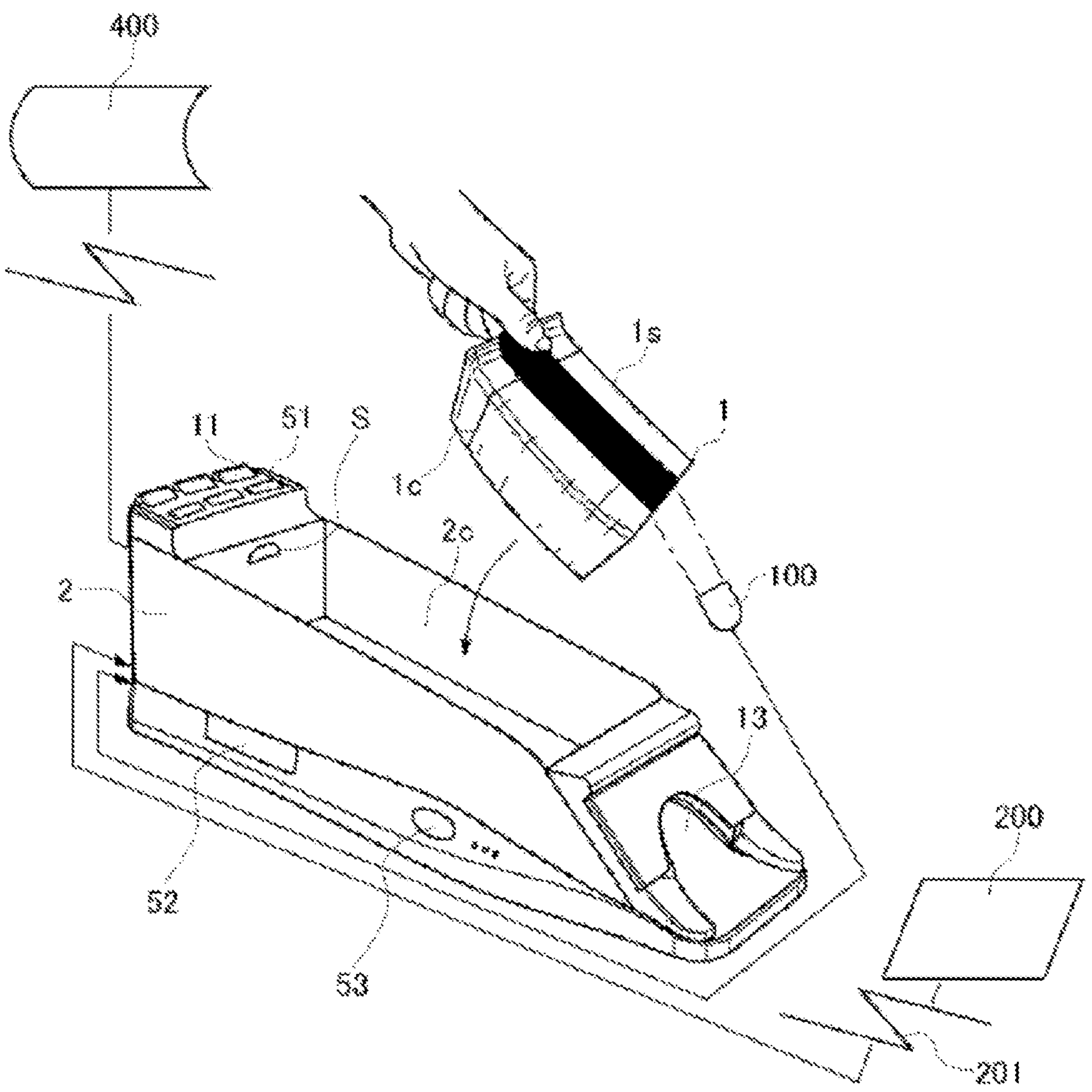
FIG. 1 is a perspective view schematically showing the entirety of a table game system according to an embodiment of the present invention.
Figure 2:
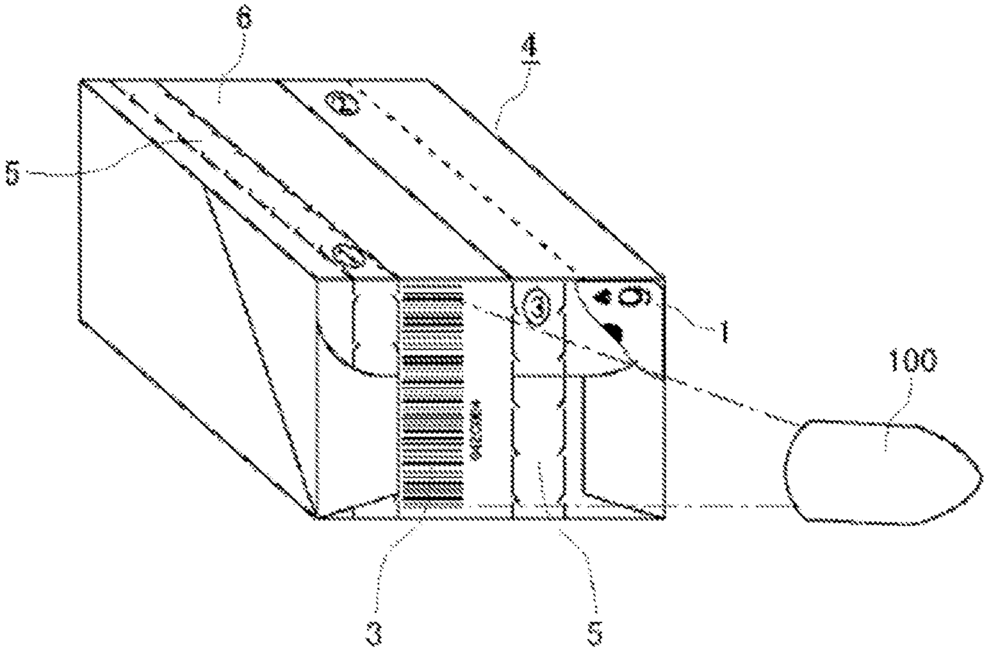
FIG. 2 is a perspective view of shuffled playing cards to be used in the table game system according to the embodiment of the present invention.

An embodiment of a table game system of the present invention will be described below. FIG. 1 is a perspective view schematically showing the entirety of a table game system according to an embodiment of the present invention. FIG. 2 is a perspective view of shuffled playing cards to be used in the table game system according to the embodiment of the present invention. Although a shuffled playing card set 1*s* is packed in the table game system of the present embodiment, when the shuffled playing card set 1*s* is to be used in the game, it is housed in a card shoe apparatus 2 after the packing is undone to enable the cards 1 of the shuffled playing card set 1*s* to be dealt one by one. During the game, the dealer deals the cards 1 from the card shoe apparatus 2 onto the game table. The cards 1 of each shuffled playing card set 1*s*, which made up of a predetermined number of decks (normally, 6, 8, 9 or 10 decks), are shuffled to be arranged in a unique and random arrangement order, and packed with a uniquely identifiable shuffled card ID attached to a packing box 4 as a barcode 3 (RFID or RF-tag can be used instead) as an ID code.

In an assembled state, a packing box 4 of the shuffled playing card set is has the shape of a rectangular parallelepiped, encasing the shuffled playing card set is as shown in FIG. 2. The packing box 4 has zippers 5 provided in two locations at a predetermined interval, each of which has zipper-shaped cut lines arranged in parallel to a longitudinal direction of the rectangular parallelepiped shape, and has a central band 6 in the central portion defined by the zippers 5 provided in the two locations. The central band 6 is colored so as to be readily distinguishable from the other portions (the central band 6 is not colored in FIG. 2). A configuration is achieved in which by removing the two zippers 5 along the cut lines, the left and right side faces of the packing box 4 are removed such that the side faces of the shuffled playing card set is would be exposed (FIG. 1). Circled numbers 1 to 3 indicating the procedural order for removing the zippers 5 are printed on each of the zippers 5, as shown in FIG. 2.

A cut card 1*c* is inserted in the shuffled playing card set is before it is set in the card shoe apparatus 2. The cut card 1*c* is inserted at any place within the latter half portion of the shuffled playing card set is when used in a game (in the last quarter or one-fifth of the shuffled playing card set 1*s*). The cut card 1*c* is used to end a game at the game table leaving about 20 to 40 cards 1 in the card shoe apparatus 2 to prevent any player or anyone from counting the ranks of the cards 1 dealt during a game to predict the ranks of the cards when the number of cards not yet dealt becomes small. Normally, when the cut card 1*s* is drawn during a game, use of the shuffled playing card set is currently in use is stopped after that game or a few games thereafter, and the game ends. The shuffled playing card set is in the card shoe apparatus 2 is replaced with a new set, and a new game begins.

In FIG. 1, the table game system of the present embodiment includes the shuffled playing card set 1*s* composed of cards 1 made up of a predetermined number of decks shuffled to have a unique arrangement order, and which has a uniquely identifiable shuffled card ID attached as a barcode 3, and a card shoe apparatus 2 for housing the shuffled playing card set is therein to allow the manual dealing of the housed cards 1 one by one onto the game table, and which has a barcode reader 100 or an input means 200 capable of identifying the shuffled card ID.

Figure 3:
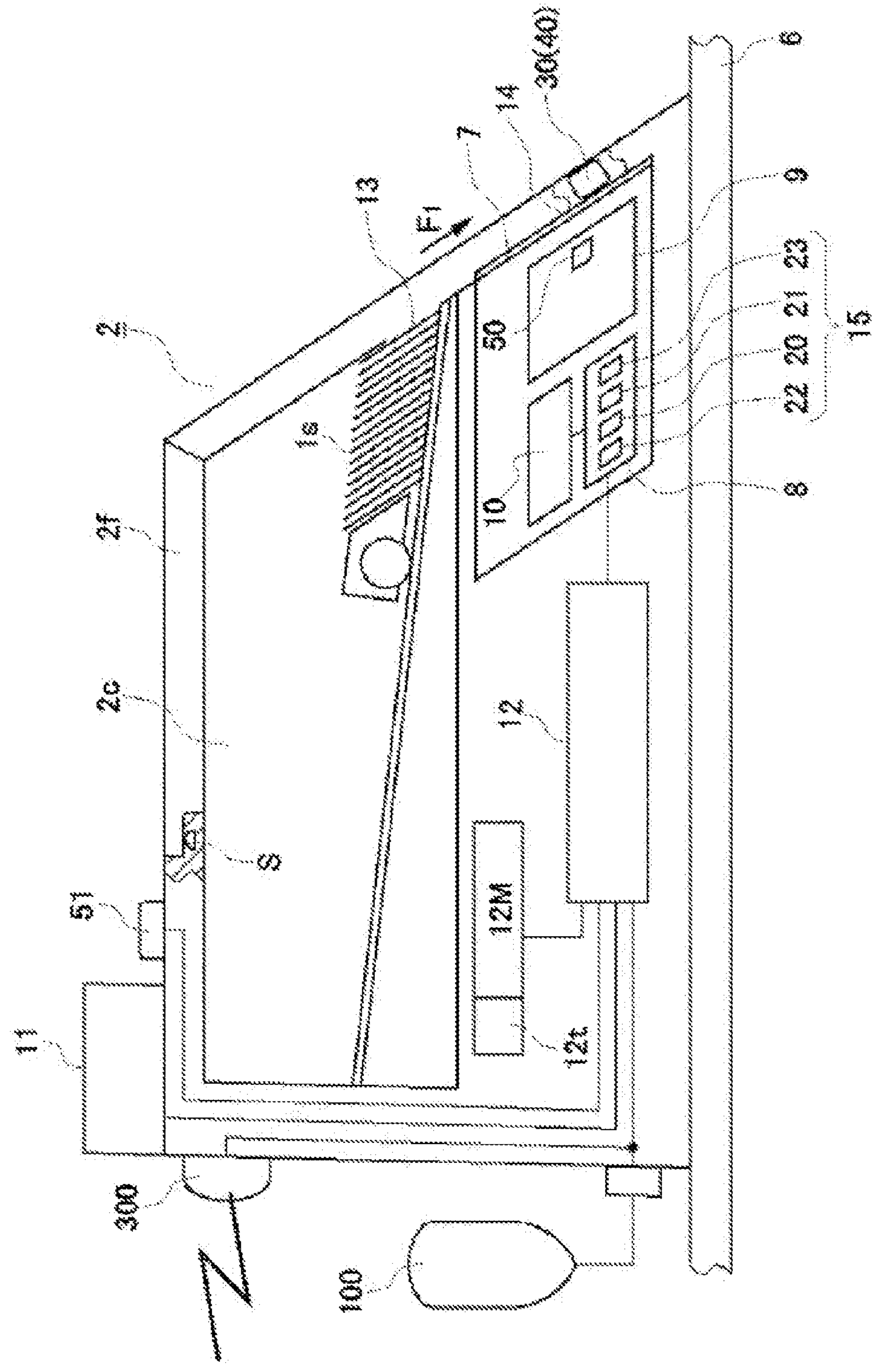
FIG. 3 is a diagram showing a general configuration of the card shoe apparatus.

In FIG. 3, the card shoe apparatus 2 of the table game system of the present embodiment is provided with a lid 2*f* that enables the insertion and removal of the shuffled playing card set 1*s*. A sensor S for detecting the opening/closing of the lid 2*f* is provided under the lid 2*f*, and which detects the opening/closing of the lid 2*f*, thereby detecting the replacement of the shuffled playing card set 1*s*. The card shoe apparatus 2 has a card guide unit 7 that guides cards 1 that are manually drawn one by one from a card housing unit 2C onto a game table, a code reading unit 8 that reads, when a card 1 is manually drawn from the card housing unit 2C by a dealer or the like of a casino, the code C that indicates a figure (number, rank) of that card 1, a winner/loser determination unit 10 that determines the winner/loser of the card game based on the numbers (ranks) of the cards 1 sequentially read by the code reading unit 8, and an output means 11 that outputs the result of the determination made by the winner/loser determination unit 10.

Figure 4:
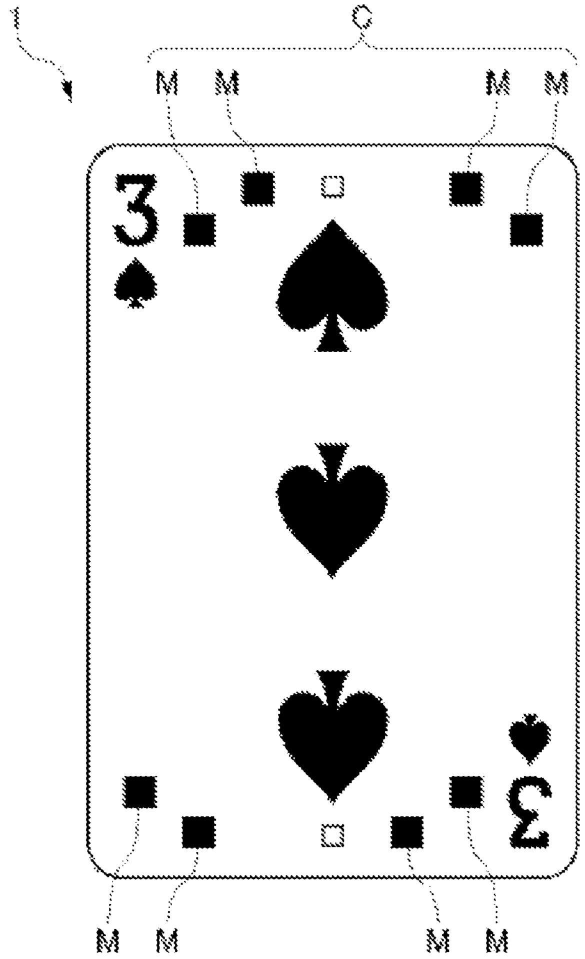
FIG. 4 is a plan view of a card according to the embodiment of the present invention.

FIG. 4 shows the cards 1 that form the shuffled playing card set 1*s*. A figure is encoded and printed on each card 1 that is used in a table game such as baccarat as a mark M in UV ink or the like, which is invisible under normal conditions. Codes C, each of which is configured with marks M, are provided in the upper and lower sides of the card 1 in a point-symmetric manner. Preferably, the code C is printed in a position where it does not overlap with the indications of the card types or indexes with a paint material that becomes visible when irradiated with a UV ray.

Figure 5:
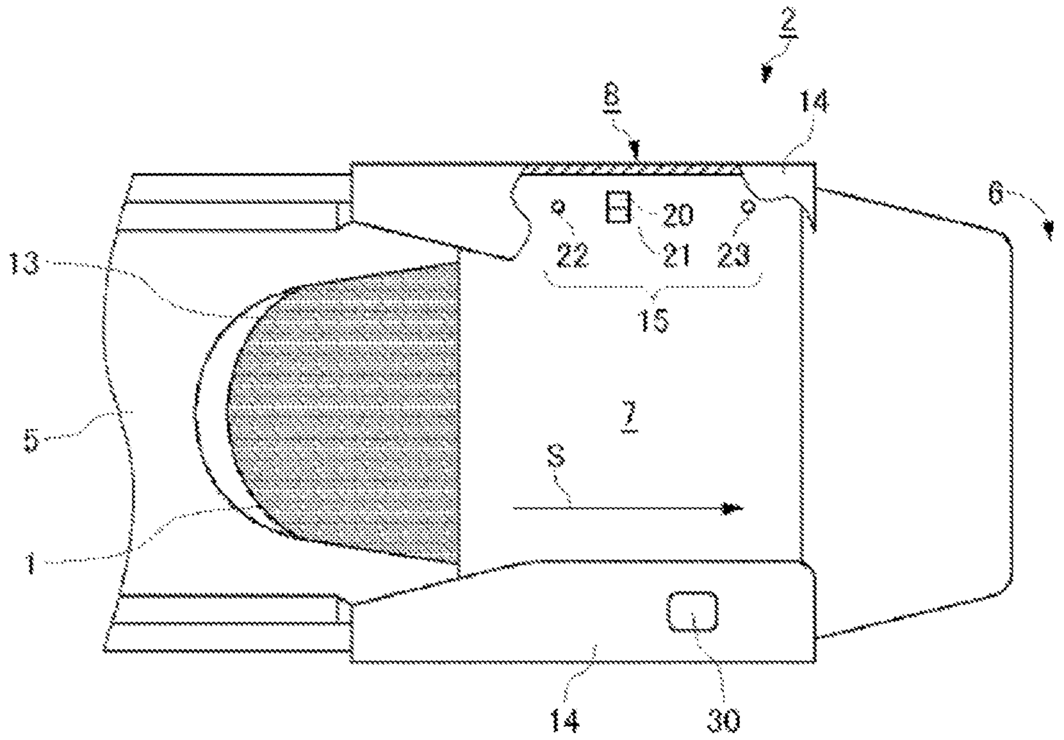
FIG. 5 is an enlarged plan view showing a main portion of a card guide of the card shoe apparatus, in which the card guide is partially broken.

Next, the code reading unit 8, which reads from a card 1 the code C that indicates the figure (number, rank) of the card 1 when the card 1 is manually drawn from the card housing unit 2C, will be described in detail with reference to FIG. 5. FIG. 5 is a plan view of a main portion of the card shoe apparatus 2. In FIG. 5, the code reading unit 8 is provided in the card guide unit 7 that guides the cards 1 manually drawn one by one from an opening 13 of the card housing unit 2C onto the game table, with the opening 13 provided in a front portion of the card housing unit 2C. The card guide unit 7 is an inclined surface, and a card guide cover 14 is attached to a portion of the edge of each of both sides thereof, with the card guide cover 14 also serving as a sensor cover. Also, each of the two card guide covers 14 is configured to be attachable/detachable with screws or the like (not shown). When a card guide cover 14 is removed, a sensor group 15 of the code reading portion 8 is exposed. The sensor group 15 is composed of four sensors, including two ultraviolet reactive sensors (UV sensors) 20 and 21, and object detection sensors 22 and 23.

The object detection sensors 22 and 23 are optical fiber sensors that each can detect the presence of a card 1 and movement thereof. The object detection sensor 22 is placed in the upstream side of the card guide unit 7 in the direction of the flow (arrow F) of the card 1, and the object detection sensor 23 is placed in the downstream side of the card guide unit 7 in the direction of the flow of the card 1. As shown in FIG. 5, the object detection sensors 22 and 23 are provided in the upstream and downstream sides of the UV sensors 20 and 21, respectively. Each of the UV sensors 20 and 21 includes an LED (UV LED) that emits an ultraviolet ray and a detector. The marks M are printed on the card 1 in UV luminescent ink that emits color when UV ray is applied. The card 1 is irradiated with the UV ray (black light), and the detector detects the light reflected by the marks M of the code C of the card 1. The UV sensors 20 and 21 are connected to a control unit 12 of the code reading unit 8 via a cable. In the code reading unit 8, the arrangement patterns of the marks M are determined based on the output signals of the detectors of the UV sensors 20 and 21, and the number (rank) corresponding to the code C is also determined.

In the code reading unit 8, the start and end of the reading performed by the UV sensors 20 and 21 are controlled by the control unit 12 based on the detection signals from the object detection sensors 22 and 23. Also, the control unit 12 determines whether a card 1 has properly passed through the card guide unit 7 based on the detection signals from the object detection sensors 22 and 23. As shown in FIG. 4, the rectangular marks M are arranged within a framework of two rows with four columns on each of the upper and bottom edges of the card 1, and the arrangement of such marks M indicates the rank (number) and the suit (Heart, Spade or the like) of the card 1. If the UV sensor(s) 20 and/or 21 detect(s) a mark M, such UV sensor(s) will give out an on signal. The code reading unit 8 determines the relative relation between the signals received from the two UV sensors 20 and 21. This enables the code reading unit 8 to identify the code based on the relative difference or the like between the two marks M detected by the two UV sensors 20 and 21, thereby identifying the number (rank) and the type (suit) of the corresponding card 1.

Figure 6:
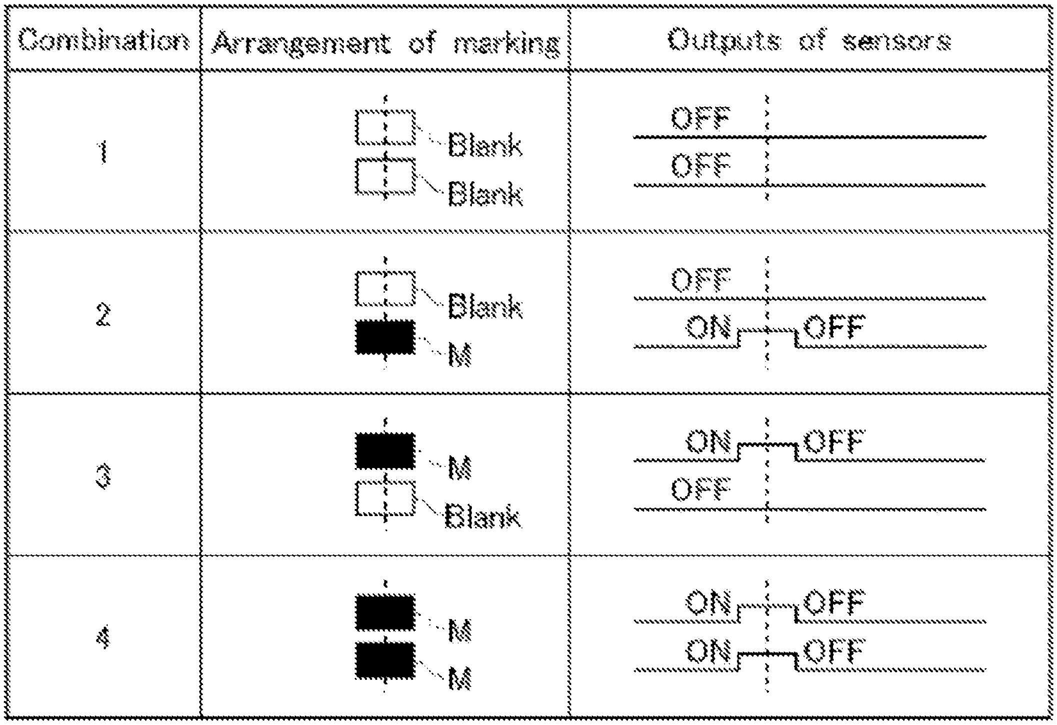
FIG. 6 is a diagram showing the relation between the output waves from sensors and marks in the card shoe apparatus.

The relation between the code C and the output of the on signals of the two UV sensors 20 and 21 are shown in FIG. 6. It is possible to identify a predetermined arrangement pattern of the marks M based on a comparison of the results of the relative changes in the output of the on signals of the UV sensors 20 and 21. As a result, in two rows (the upper and lower rows), four types of arrangement patterns of the mark M are possible, and since patterns are printed in four columns, it is possible to form 256 types of codes (4×4×4×4). Fifty two (52) different playing cards are each assigned to one of the 256 codes, and the associations of such assignments are stored in a memory or by a program as an association table. The card reading unit 8 can, by identifying the code C, identify the number (rank) and the type (suit) of the card 1 based on that predetermined association table (not shown). Also, 52 cards can be freely associated with 52 codes out of the 256 codes to be stored in the association table, and thus, there will be a variety of associations between them. Therefore, it is possible to change the associations among the 256 codes C and the suits and ranks of the 52 cards depending on the time or place. Preferably, the code C is printed in a position where it does not overlap with the indications of the card types or indexes with a paint material that becomes visible when irradiated with a UV ray.

Next, the control unit 12 will be described in further detail. The control unit 12 is achieved by a computer apparatus, and includes the winner/loser determination unit 10 that automatically determines the winner/loser of a game, and the like. This process function (in the control unit 12) is achieved by installing in a computer a program for determining the winner/loser, which is executed by a computer processor. Also, the control unit 12 reads from the barcode 3 read by the barcode reader 100 the shuffled card ID, which uniquely identifies the shuffled playing card set 1*s*, and stores the shuffled card ID in a reading memory 12M. The control unit 12 reads the barcode 3 with the barcode reader 100, and stores the uniquely identifiable shuffled card ID. Then, the control unit 12 identifies the shuffled playing card set is that is currently being used in the game and the current time, and stores them in connection with the shuffled card ID. The control unit 12 causes each of the following specified events that occur while the shuffled playing card set 1*s* identified by the shuffle card ID is being used at the game table to be stored in the memory 12M in connection with the time of occurrence thereof. Also, the ordinal number of the card subject of the occurrence of the relevant event within the shuffled playing card set 1*s* currently set in the card shoe apparatus, or the ordinal number of the game subject of the occurrence of the relevant event among the individual games played with such shuffled playing cards (the winner (the player or the banker) is determined for each individual game, and after betting chips are settled, the next individual game starts) is stored.

The items of specified events to be stored in connection with the shuffled card ID include at least one of the following: (1) a reading error in the cord reading unit 8 of a card in the identified shuffled playing card set; (2) an end of a game due to an operation of an end button 53 to end the use of the shuffled playing card set is currently set in the card shoe apparatus 2, or the drawing of the cut card 1*c* from the shuffled playing card set is currently set in the card shoe apparatus 2; (3) an attempt to draw a card when no card should be drawn according to the rules of the card game; (4) an attempt to move or insert a card in a direction opposite to a drawing direction of the opening 13; and (5) an occurrence of a preset irregular operation to be determined to be irregular by the card shoe apparatus 2.

Note that the reading error in item (1) above refers to a failure by the cord reading unit 8 that reads two marks M of the card 1 to identify the card based on the association table due to the code that is read not being a predetermined code, or a failure to identify the number (rank) and the type (suit) of the card 1 that correspond to the code read. With respect to item (2) above, the end button 53 is pressed to end the use of the shuffled playing card set 1*s* currently set in the card shoe apparatus 2. Upon this action, the end of a game is registered in the card shoe apparatus 2. Also, if the cut card 1*c* is drawn from the shuffled playing card set is currently housed in the card shoe apparatus 2, the game ends at the next game or after a few games, and the remaining cards of the shuffled playing card set is will not be used anymore. An attempt to draw any card when no card should be drawn according to the rules of the card game as described in item (3) above will be described later. Any attempt to insert any card in the opposite direction at the opening 13 as described in item (4) above refers to a case where the object detection sensors 22 and 23 detect a fraudulent act such as the insertion of any card in the direction opposite to the direction of the movement of a card 1 (arrow F) under the relevant conditions, and assumes a case where the object detection sensors 22 and 23 detect movement of a card 1 in the direction opposite to the arrow F. Any preset irregular situation that will be determined by the card shoe apparatus 2 as irregular as described in item (5) above refers to, for example, a situation where the card 1 stays above the object detection sensors 22 and 23 for a period longer than the predetermined period, and such irregular situation has been input and stored in advance in the memory 12M as a program.

The memory 12M stores the occurrence of any security item in connection with the relevant shuffled card ID read by the barcode 3, and when it stores a security item, it stores the time of occurrence of that security item as well. For this purpose, the memory 12M includes a clock 12*t*. It also includes an external transmission apparatus 300 for externally transmitting the occurrence of a security item with the shuffled card ID. Notice of the occurrence of a security item and the time of its occurrence is given to the management division or the pit of the casino via the external transmission apparatus 300 in connection with the relevant shuffled card ID. The management division of the casino stores and registers such transmitted items in connection with the relevant shuffled card IDs in a database 400. The dealer or the like is also informed about the occurrence of a security item by the display made by lamps 51 and a liquid crystal display unit 52.

Next, a variation in which an input means 200 is provided instead of the barcode reader 100 that is capable of identifying the shuffled card ID will be described. Instead of reading the barcode 3 with the barcode reader 100 to identify the shuffled card ID of the card set currently being used, a configuration is possible in which a barcode reader is provided in a separate device installed on the game table (for example, an apparatus for the disposal of a card 1 or a device that confirms the card 1 disposed), and the shuffled card ID [of the card set] to be used is obtained by such a barcode reader, and the shuffled card ID is input to the card shoe apparatus 2 through communication 201 with such a device. In this case, the separate device with the barcode reader serves as an input apparatus capable of identifying the shuffled card ID.

Figure 7A:
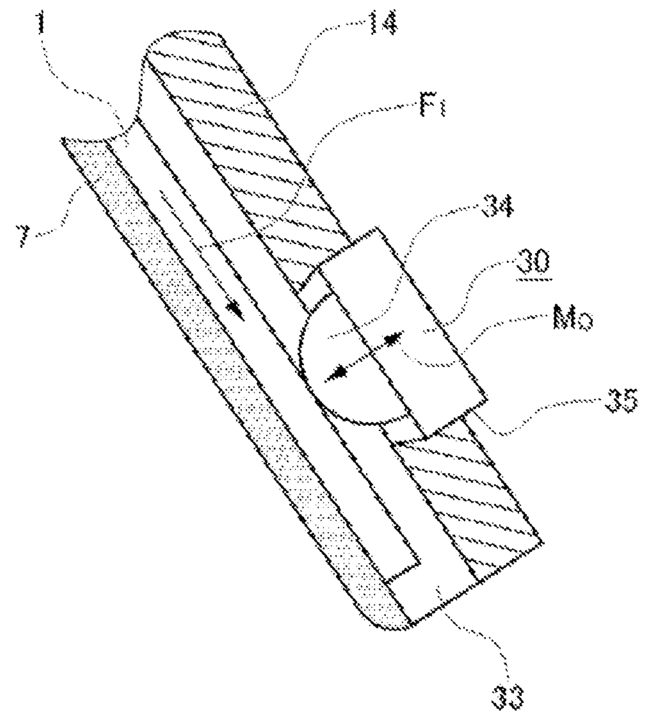
FIG. 7A is an enlarged cross-sectional view of a card entry/exit restriction means that restricts the entry/exit of cards from a card housing unit of the card shoe apparatus.
Figure 7B:
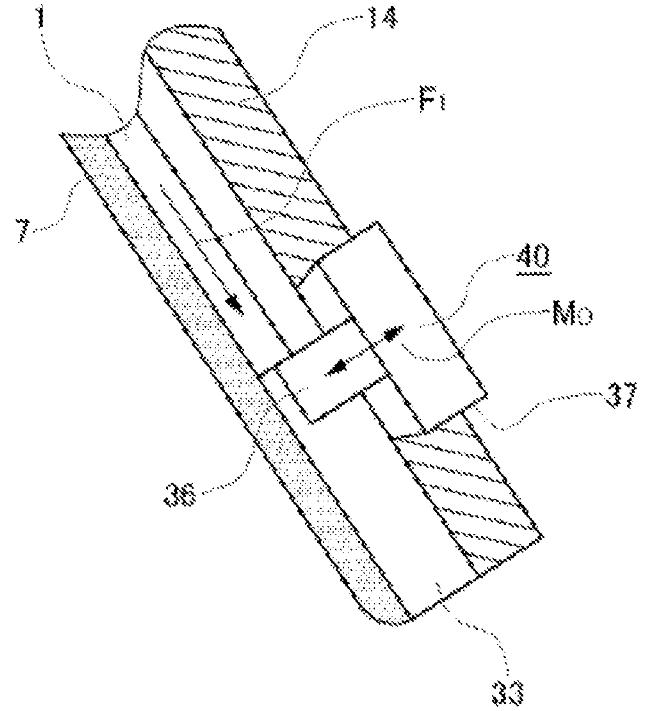
FIG. 7B is an enlarged cross-sectional view of a variation of the card entry/exit restriction means.

Next, a card entry/exit restriction means 30 that restricts the entry/exit of a card 1 to/from the card housing unit 2C will be described with reference to FIGS. 7A and 7B. The card guide unit 7 is provided with the card entry/exit restriction means 30 to restrict the entry/exit of a card 1 via the card housing unit 2C. In FIG. 7A, the card entry/exit restriction means 30 is provided in the card guide cover 14 of the card guide unit 7 that guides the cards 1 drawn one by one onto the game table from the opening 13, which is provided in a front portion of the card housing unit 2C. The card entry/exit restriction means 30 has a structure by which when a card 1 passes through a slot 33 between the card guide unit 7 and the card guide cover 14, a lock member 34 presses the card 1 to block its entry/exit within the slot 33. The lock member 34 is capable of moving in the direction indicated by the arrow Mo by a driving unit 35 composed of an electro-magnetic solenoid, a piezoelectric device or the like, such that it can take two positions, namely, a position pressing the card 1 (restricted position) and a position allowing the card 1 to pass through. The driving unit 35 is controlled by the control apparatus 12, and moves the lock member 34 to two positions, namely, a position pressing the card 1 and a position allowing the card 1 to pass through. The rules of the baccarat game are programmed and stored in advance in the control apparatus 12.

Next, a variation of the card entry/exit restriction means 30 will be described with reference to FIG. 7B. A card entry/exit restriction means 40 of the variation has a structure by which when a card 1 passes through the slot 33 between the card guide unit 7 and the card guide cover 14, a lock member 36 protrudes into the slot 33 to block movement of the card 1. The lock member 36 is capable of moving in the direction indicated by the arrow Mo by a driving unit 37 composed of an electro-magnetic solenoid, a piezoelectric device or the like, such that it can take two positions, namely, a position blocking movement of the card 1 (restricted position) and a position allowing the card 1 to pass through. The driving unit 37 is controlled by the control apparatus 12, and moves the lock member 36 to two positions, namely, a position blocking movement of the card 1 and a position allowing the card 1 to pass through.

The card entry/exit restriction means 30 (40) is caused to function by the driving unit 35 or 37 being controlled by a program of the control apparatus 12 to prevent the fraudulent entry/exit of a card 1. The card entry/exit restriction means 30 (40) is provided with the object detection sensors 22 and 23 as sensors to detect movement of the card 1, and has a function of detecting movement of a card 1 with these sensors 22 and 23 to restrict such movement. The details of the contents (programmed contents) performed to prevent the fraudulent entry/exit of a card 1 includes at least one of the following: 1) A function of blocking the insertion of a card 1 inserted or moved in a direction opposite to the direction of the arrow F, namely, from the exterior toward the card housing unit 2C via the opening 13. In this case, although the card 1 inserted for the purpose of cheating passes through the slot 33 between the card guide unit 7 and the card guide cover 14, the movement of the card 1 in a direction opposite to the normal direction (the direction opposite to the arrow F in FIG. 3) is detected based on the detection signals from the object detection sensors 22 and 23, and due to the program of the control apparatus 12, the driving units 35 and 37 will move their corresponding lock members 34 and 36 to their respective positions of pressing or blocking the card 1. In this case, the control unit 12 determines that the situation falls under the security item (4), namely, an attempt to move or insert a card in an opposite direction through the opening; 2) A function of blocking the drawing of a card 1 from the card housing unit 2C when such drawing should not be allowed based on the information on the suits and the ranks of the cards 1 read by a card reading unit (this means the code reading unit 8 that reads from a card 1 the code C that indicates a figure (number, rank) of that card 1 when the card 1 is drawn from the card housing unit 2C). In this case, as described above, the rules of the baccarat game are programmed in advance in the control apparatus 12. In the baccarat game, whether each of the banker and the player should draw two or more cards 1 is uniquely determined according to the total of the ranks (numbers) of the two cards already dealt to each of them. Thus, if the dealer of a table attempts to deal a card 1 in a case where the third card should not be drawn, which is against the rules, movement of the card 1 is restricted. If the card 1 is attempted to be drawn at a time or state when such drawing should not be allowed, movement of the card 1 is detected based on a signal given by the object detection sensor 22 regarding the detection of the card 1, and the driving units 35 and 37 will move their corresponding lock members 34 and 36 to their respective positions of pressing or blocking the card 1 due to the program of the control unit 12. Then, the lock members 34 and 36 will move to their respective positions of pressing or blocking the card 1, and the dealing of an additional card 1 is blocked (the positions shown in FIG. 7B). In this case, the control unit 12 determines that the situation falls under the security item 3, namely, an attempt to draw a card when no card should be drawn according to the rules of the card game. This corresponds to item (3) of the above-described specified events to be stored in connection with a shuffled card ID. That is, with respect to the above-mentioned item (3), the occurrence of an attempt to draw a card when no card should be drawn according to the rules of the card game is registered in the control unit 12.

For each shuffled card ID of the shuffled playing card set 1*s*, when an event falling under any of the specified events (security items) occurs thereto, the management division or the pit of the casino is informed via an external transmission apparatus 300 of the fact and the time of said occurrence in connection with the relevant shuffled card ID, and such information is forwarded to the database 400 and stored therein. Furthermore, the dealer or the like is informed of the occurrence of a security item by the display made by the lamps 51 and the liquid crystal display unit 52.

Such transmitted items are registered in the database 400 of the management division of the casino so that an item that falls under at least one of the following is registered in connection with the shuffled card ID identified with respect to the card set currently used in the game, thereby providing overall control of the operations of the casino or an efficient operation thereof.

For the overall control of the operations of the casino or the efficient operation thereof, the management division of the casino register in the database and use, for example, the data items described as follows: (1) the game table used; (2) the dealer (person who draws the cards) in charge of the game table used; (3) the start time of the use of the identified shuffled playing card set; (4) the end time of the use of the identified shuffled playing card set; (5) the time period when the card(s) of the identified shuffled playing card set were present on the game table; (6) information concerning the pit or the card room where the identified shuffled playing card set is managed before it is delivered to the relevant game table; (7) information concerning the process of disposal of the identified shuffled playing card set after its use at the game table; (8) information on whether all of the cards of the identified shuffled playing card set have reached the disposal apparatus; (9) information concerning the pit or the card room where the shuffled playing card set identified in advance is managed before it is delivered to the relevant game table; (10) information concerning the win and the lose at the game table where the identified shuffled playing card set is used; (11) the time period after the end of the game played using the identified shuffled playing card set and until the start of the next game with the new shuffled playing card set; (12) the time period from the start to the end of the game played using the identified shuffled playing card set; and (13) information on the purchase or procurement of the identified shuffled playing card set.

Figure 8:
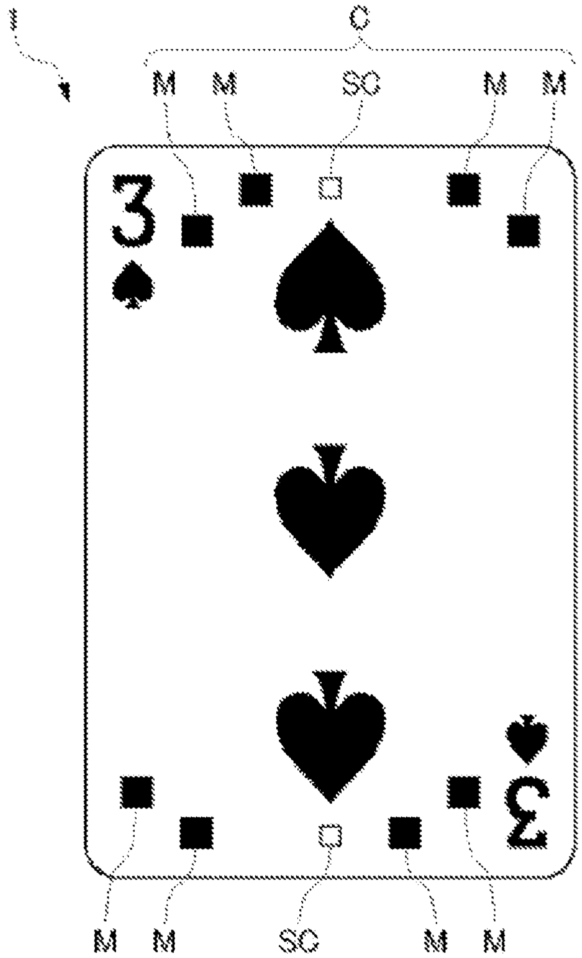
FIG. 8 is a plan view of a card according to the embodiment of the present invention.
Figure 9:
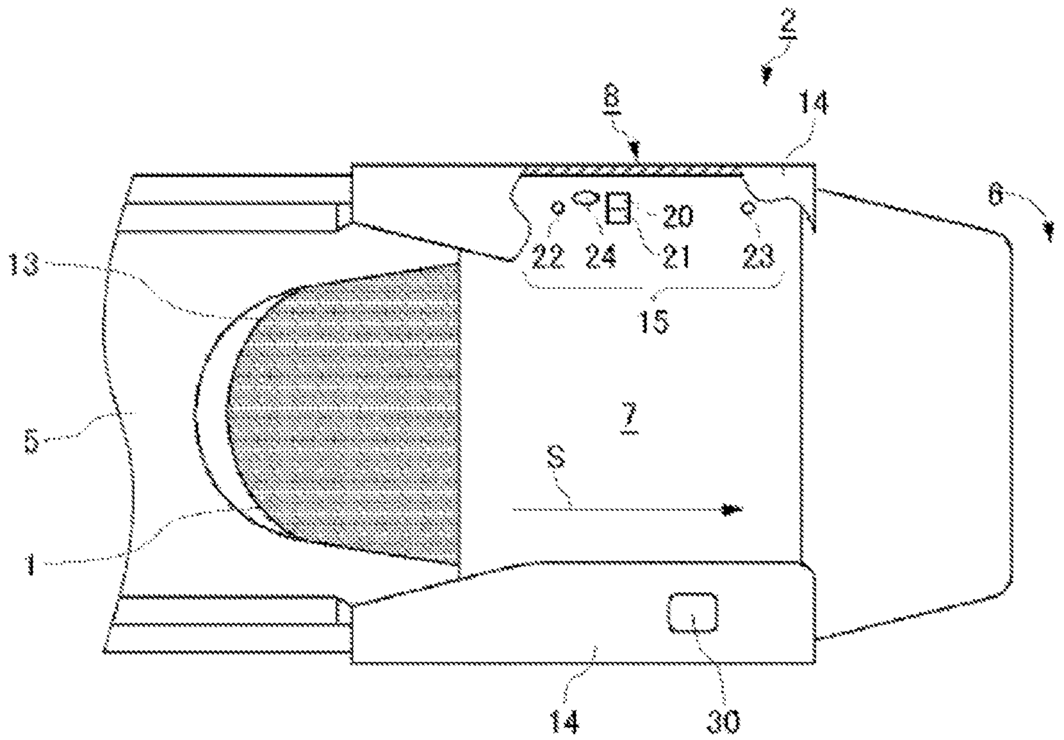
FIG. 9 is an enlarged plan view showing a main portion of a card guide of the card shoe apparatus, in which the card guide is partially broken.

The group code SC will be described in further detail. As shown in FIG. 8, the card 1 is provided with a group code SC that is configured by encoding information that represents the group of the card and is invisible under normal conditions (for example, UV ink). This group code SC is provided in the same position in at least the cards of the same set. The group code SC is a substance or material itself that emits, as a code, light rays of different wavelength spectra when irradiated with light rays of different wavelengths, and is configured such that light rays of different wavelengths are emitted when irradiated with light rays of different wavelengths. Whether the group code SC identified and the group code SC read by the code reading unit 8 match or not is determined by the control unit 12, depending on whether or not the predetermined wavelength of light ray and that of the read group code SC match. At the start of the game, the shuffled card ID of the shuffled playing card set is that is housed in the card shoe apparatus 2 to be used is identified by reading the barcode 3 (as the ID code) with the barcode reader 100. The shuffled card ID and the group code SC are associated with each other such that if the shuffled playing card set 1*s* to be used is identified, the group code SC attached to such shuffled playing card set 1*s* is identified based on the shuffled card ID. Whether or not the group code SC identified by the control unit 12 of the card shoe apparatus 2 matches the group code SC read by the code reading unit 8 is determined when the group code SC attached to the card 1 used is actually read. Thus, it is impossible to know how the group code SC is determined from the outside.

A polymer material, DNA material or the like that has a molecular structure with which a light ray of a specific wavelength is emitted against light is used as a substance or material that emits light rays of different wavelength spectra against invisible light rays of different wavelengths (ultraviolet ray, infrared ray, etc.). A polymer material that has a molecular structure with which a light ray of a specific wavelength is emitted against light is printed in the upper and lower edges of the card 1 as shown in FIG. 8, as the group code SC. The group code SC cannot be recognized by human eyes under normal use conditions (daylight, natural light, or the like). The group code SC is read by the UV sensor 24. The group code SC is read by the UV sensor 24 provided in the card guide 7 when the card 1 is guided by the card guide unit 7 as it is slid through it. Also, the group code SC may be mixed with an infrared or ultraviolet responsive ink for printing the code C, which is used for identifying the number (rank) of the card 1, as printed. Each group code SC within the infrared or ultraviolet responsive ink cannot be recognized by human eyes under normal use conditions (daylight, natural light, or the like). The light source for reading the group code SC is integrally provided with the UV sensor 24. In Embodiment 1, LEDs that emit ultraviolet rays of two different wavelengths (UV LEDs) are used as sources of light (not shown).

The group code SC is printed independently and in the same position at least for the same set, as described above. However, a configuration is also possible in which the group code SC is configured using a certain substance or material that serves as a code, and such substance or material is contained in the coating material, anchor coating material, or in the ink to print the back pattern, mark, index, or the code to indicate the number of the mark on the surface of the card. As a variation of the present embodiments, the group code may be printed on the card 1 in a similar manner to that of the mark M or the barcode 3. The group information, which indicates the group of the group code, may be different for each deck or for each plurality of decks of cards 1. The group information may be differentiated for each casino or table where the cards are used, or for any other unit. The group information may be different for each card supply source (card shoe or the like). In addition, a different group code may be set for each manufacturing lot, or each casino that uses the cards.

The invention claimed is:

1. A table game system comprising:

a set of shuffled playing cards composed of a plurality of decks of playing cards having a unique arrangement order;

a shuffled card ID, which is indicated on the set of shuffled playing cards as an ID code, for uniquely identifying the set of shuffled playing cards;

ID obtaining means for detecting the shuffled card ID;

a card shoe apparatus; and a database being accessibly connected to the card shoe apparatus, wherein the card shoe apparatus comprises:

a card housing unit for storing the shuffled playing cards, an opening through which the playing cards are drawn from the card housing unit to a game table one by one onto the game table, a card reading unit for reading information of each of the playing cards drawn from the card housing unit onto the game table, a control unit having:

a winner/loser determination unit for judging a winner/loser of a card game based on the playing card information read by the card reading unit, and a display unit for showing a result of the judgement by the winner/loser determination unit, the control unit inputs the shuffled card ID detected by the ID obtaining means into the database, the control unit identifies a current card set, which is used in a current game, with the shuffled card ID, the database contains game table information, which indicates that one of the game tables on which the identified current card set is used, and specified events with the shuffled card ID, and the specified events include at least one of (1) to (5):

(1) a reading error in the card reading unit of a card in the identified shuffled playing cards;

(2) an end of a game due to an operation of an end button to end the use of the shuffled playing cards currently set in the card shoe apparatus, or the drawing of a cut card from the shuffled playing cards currently set in the card shoe apparatus;

(3) an attempt to draw a card when no card should be drawn according to the rules of the card game;

(4) an attempt to move or insert a card in a direction opposite to a drawing direction of a card at the opening; and (5) an occurrence of a preset irregular operation to be determined to be irregular by the card shoe apparatus.

2. The table game system according claim 1, wherein the database contains at least one of the following items (i) to (x) of information in connection with the shuffled card ID identified as the current card set, (i) a dealer of the game table at which the identified shuffled playing cards are used;

(ii) start time of use of the identified shuffled playing cards;

(iii) end time of the use of the identified shuffled playing cards;

(iv) time period while the identified shuffled playing cards were present on the game table;

(v) a management place at where the identified shuffled playing cards before the identified shuffled playing cards are delivered to the game table;

(vi) a process of disposal of the identified shuffled playing cards after the use of the identified shuffled playing cards;

(vii) whether all of the identified shuffled playing cards have been delivered to a disposal apparatus;

(viii) at where the identified shuffled playing cards before the identified in advance shuffled playing cards are delivered to the game table;

(ix) winning/losing at the game table where the identified shuffled playing cards are used; and (x) procurement of the identified shuffled playing cards.

3. The table game system according to claim 1, wherein the ID obtaining means is connected to the control unit through a network to obtain the shuffled card ID.

4. The table game system according to claim 1, further comprising a transmit unit for outputting information indicating occurrence of the specified events with the shuffled card ID to an external device.

5. The table game system according to claim 1, the database contains information on at least one of:

(a) one of the playing cards which is drawn from the card shoe apparatus when the specified events happen;

(b) one of the card games when the specified events happen; and (c) time when the specified events happen.

* * * * *